UNITED STATES PATENT OFFICE.

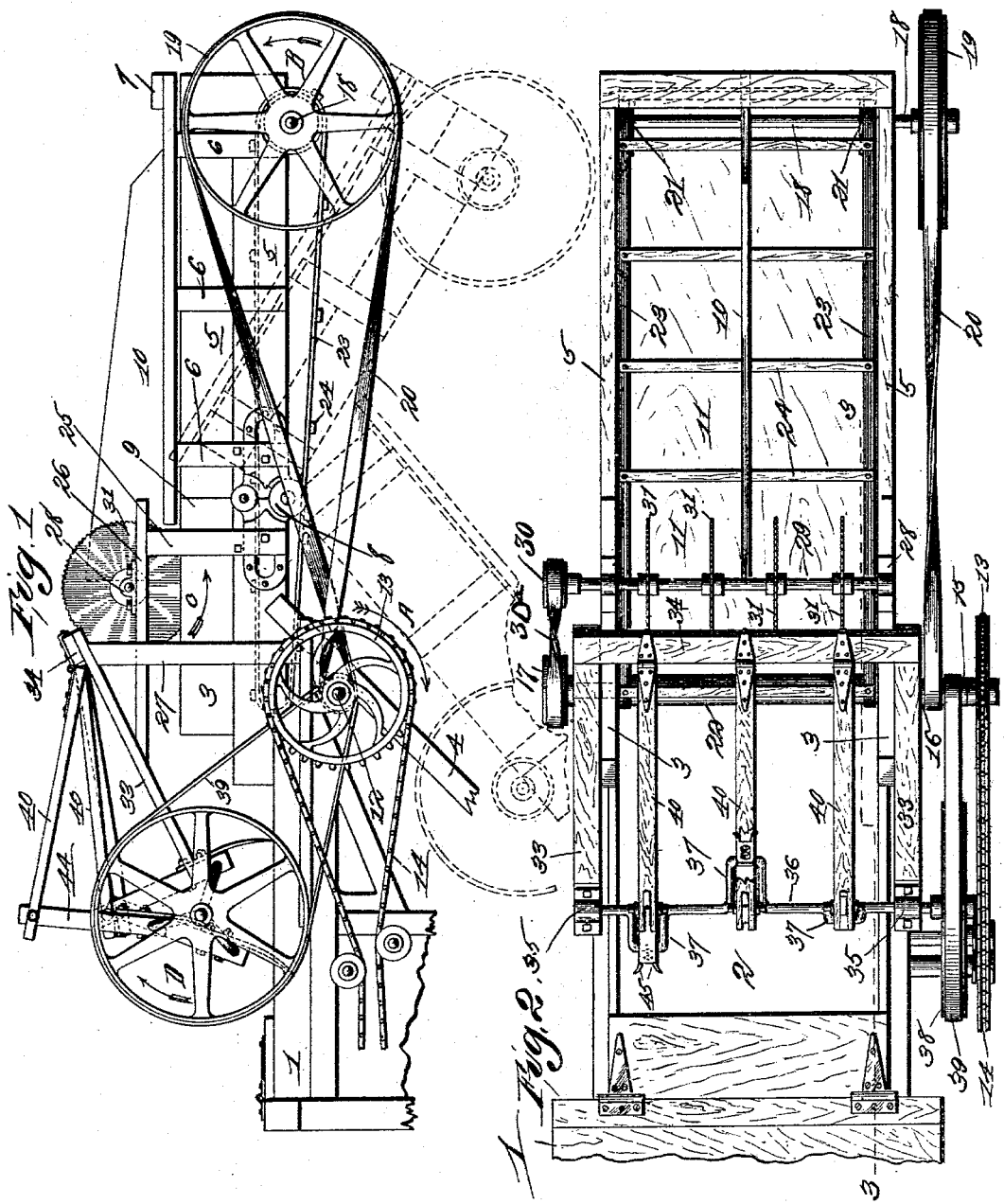

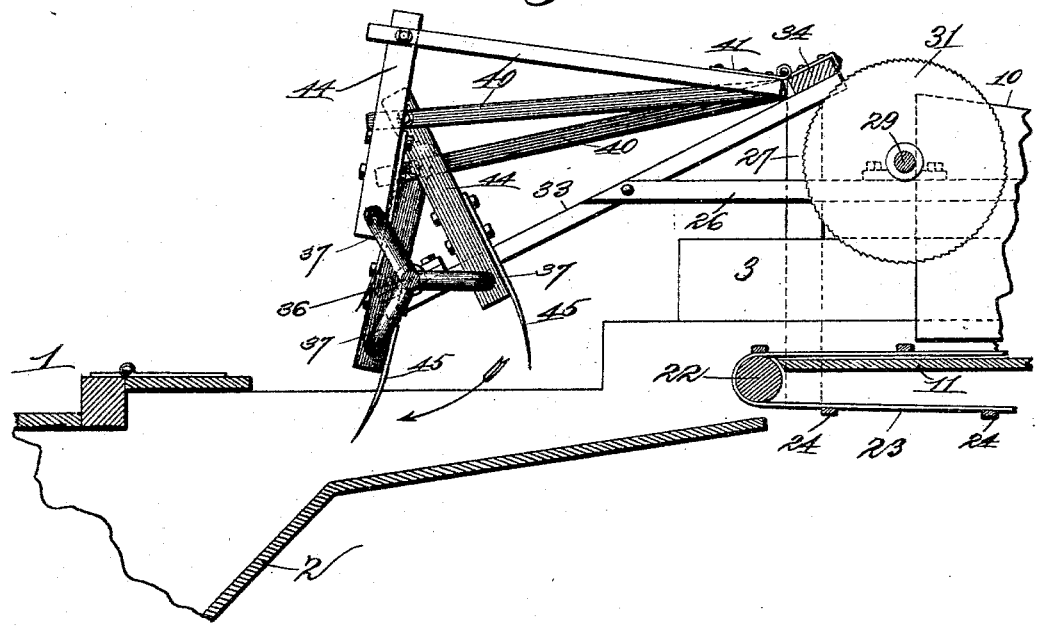
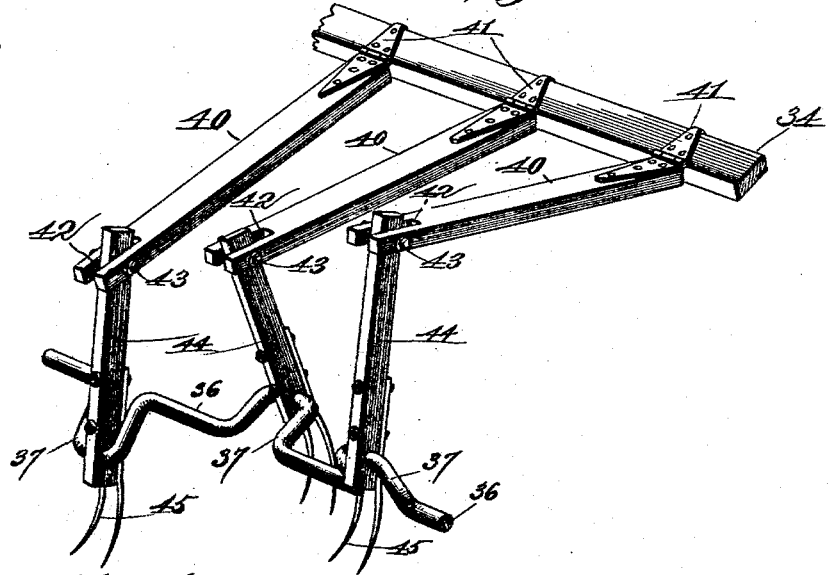

HANRY WAPPALHORST, OF ST. CHARLES, MISSOURI.

BAND-CUTTER AND FEEDER.

SPECIFICATION forming part of Letters Patent No. 548,486, dated October 22, 1895.

Application filed November 21, 1894. Serial No. 529,490. (No model.)

*To all whom it may concern:*

Be it known that I, HANRY WAPPALHORST, of the city of St. Charles, St. Charles county, State of Missouri, have invented certain new and useful Improvements in a Combined Band-Cutter and Feeder, of which the following is a full, clear, and exact description, reference being had to the accompanying drawings, forming a part hereof.

My invention relates to a combined band-cutter and feeder; and it consists in the novel construction, combination, and arrangement of parts hereinafter described and claimed.

The object of my invention is to construct an improved combined band-cutter and feeder that shall be simple in construction and efficient and complete in all its workings and operation.

In the drawings, Figure 1 is a side elevation of my improved band-cutter and feeder, the same being applied to a thrashing-machine as required for practical use. Fig. 2 is a top plan view of my complete invention. Fig. 3 is a longitudinal sectional view taken approximately on the indicated line 3 3 of Fig. 2. Fig. 4 is a view in perspective of the feeding-forks of which I make use in carrying out my invention.

Referring by numerals to the accompanying drawings, 1 indicates the end of a thrashing-machine, the same having an inclined floor 2, leading to the cylinder-chamber. Mounted upon the ends of the thrasher 1 and on each side thereof are side-boards 3, the same being held to the end of the thrasher by suitable braces 4. Side-boards 5 of the same height as are the side-boards 3 are held together by vertical braces 6 and a cross-piece 7. This structure so formed is secured to the ends of the side-boards 3 and in alignment therewith by means of suitable hinges 8. Suitable hooks 9 are also provided near the meeting edges of the side-boards 3 and 5 to more firmly hold said side-boards together.

A center or dividing board 10 is fixed in the framework of the hinged portion of the band-cutter and feeder that extends forward to a point adjacent the band-cutting saws of which I make use. The side-boards 3 and 5 are provided with suitable floor-boards 11.

Transversely positioned in the recess between said inclined braces 4 and said inclined floor 2 and in a plane below and adjacent the ends of the thrasher and band-cutter frame and mounted in bearings fixed thereto is a main driving-shaft 12, the same having mounted on one end a sprocket-wheel 13, that is driven by a sprocket-chain 14, said sprocket-chain 14 being driven by a sprocket-wheel mounted upon the cylinder-shaft. (Not shown.)

Mounted upon the shaft 12, between the sprocket-wheel 13 and the framework are a pair of pulleys designated, respectively, by the numerals 15 and 16. On the opposite end of the shaft 12 is fixed a pulley 17. Transversely positioned beneath the outer end of the hinged portion of the feeder is a shaft 18, upon the end of which and in direct alignment with the pulley 16 upon the shaft 12 is mounted a belt-wheel 19. A belt 20, the same being twisted, connects the pulley 16 with the belt-wheel 19. Mounted upon the shaft 18 just inside the side-boards 5 are pulleys 21.

Journaled in the side-boards 3 at the beginning of the inclined floor 2 that leads to the cylinder-shaft is a roller 22, that extends from one of the side-boards 3 to the other. A pair of belts 23, the same being connected by transversely-positioned slats 24, form an endless carrier, the same passing around the pulleys 21 and the roller 22. The upper half of this endless carrier passes over the floor-boards 11 between the side-boards 3 and 5. Bolted to the side-boards 3 and extending vertically therefrom are upright pieces 25, upon the top ends of which are horizontally-positioned bars 26, that are also fixed to vertical pieces 27, that extend upwardly from the side-boards 3.

Mounted in bearings 28, that are bolted to the horizontal bars 26, is a transverse shaft 29, on the outer end of which is a pulley 30, which is in direct alignment with the pulley 17 upon the end of the shaft 12. A twisted belt 30ª connects the pulleys 17 and 30.

Mounted upon the shaft 29 are a plurality of band-cutters 31, the same consisting of circular metallic plates, the edges of which are sharpened and provided with teeth or serrations. It is essential that there be an equal number of these cutters on each side of the center or dividing board 10.

Fixed to the upper ends of the upright pieces 27 and to the front ends of the horizontally-positioned bars 26 are inclined bars 33. Mounted upon the upper ends of these inclined bars 33 is a cross-piece 34.

Mounted in bearings 35, that are bolted to the lower front ends of the inclined bars 33, is a shaft 36, the same being provided with equidistant radially-arranged bends or cranks 37. Upon the outer end of the shaft 36 and in alignment with the pulley 15 on the shaft 12 is a belt-wheel 38. A belt 39 connects the belt-wheel 38 with the pulley 15.

A series of bars 40 are connected to the cross-bar 34 by ordinary strap-hinges 41. The forward ends of these bars 40 are bifurcated, as indicated by 42. Held to freely move in said bifurcated ends 42 by means of bolts 43 are the upper ends of bars 44, the lower ends of which are connected to the cranks or bends 37 in the shaft 36. Bolted to the rear sides of the lower ends of the bars 44 are forks 45, the same being bent or curved forwardly.

The operation is as follows: The movement imparted to the sprocket-wheel 13 and shaft 12 by the sprocket-chain 14 from the cylinder-shaft is in the direction of the arrow A, Fig. 1. The pulley 16 being rigidly mounted upon the shaft 12, said pulley will also be moved in the direction of said arrow. The belt-wheel 19 being rigidly mounted upon the shaft 18 and connected to the pulley 16 by a crossed or twisted belt 20, the movement of said wheel and shaft will be in the direction of the arrow B, Fig. 1. This, as may be plainly seen, moves the endless carrier in the desired direction. The pulley 30, rigidly mounted upon the shaft 29, being connected to the pulley 17 upon the shaft 12 by a crossed belt the movement of said shaft and pulley and consequently the band-cutters will be in the direction of the arrow C, Fig. 1, or directly the reverse of the movement of the endless carrier. The belt-wheel 38 upon the shaft 36 being connected by a straight belt 39 to the pulley 15, the movement of the belt-wheel 38 and shaft 36 will necessarily be in the direction of the arrow D, Fig. 1. The forks 45, being mounted upon the lower ends of the bars 44, that are carried by the cranks of the shaft 36, will necessarily be moved in the direction of the arrow E, Fig. 3. The sheaves or bundles of grain that are being thrashed are deposited on each side of the center or dividing board 10 and directly upon the endless carrier formed by the belts 23 and cross-slats 24. By said endless carrier they are carried forward and directly beneath the rotating band-cutters 32, the same having the serrated or saw-toothed edges. By these circular cutters the bands are cut and the sheaves or bundles carried forward by the endless carrier. As said sheaves or bundles, the bands of which are now cut, leave the endless carrier they are caught by the rapidly-moving forks 45 and by them passed into the cylinder-chamber. By the peculiar hinging and positioning of the forks and their connecting-arms it will be seen how a motion especially adapted for throwing the grain forward and into the cylinder-chamber is given. By providing a plurality of band-cutters on each side of the center or dividing board 10 the liability of the non-cutting of the bands of the sheaves or bundles is reduced to a minimum. By hinging the feeder at approximately a central point a portion of said feeder may be lowered and folded inward to a point below and closely adjacent the main shaft 12, as indicated by dotted lines in Fig. 1, which greatly facilitates the movement of the thrasher during transportation.

The advantage of locating the main driving-shaft in the recess beneath the fixed section of the band-cutter lies in the fact that all the mechanism of the band-cutter may be driven from a single main shaft; and yet said main shaft is so located in said recess that the hinged section of the band-cutter may be compactly folded beneath said shaft. Furthermore, said main shaft, located in a position where it and its connections are out of the way, permits free access to the parts above the device.

Thus it will be seen how I have constructed a combined band-cutter and feeder that possesses superior advantages in point of compactness, simplicity, durability, and general efficiency.

What I claim is—

The combination, with a thrashing machine, of the inclined floor 2, inclined braces 4, and a fixed section of the band cutter frame forming a recess in a plane below said section, and the main driving-shaft 12 mounted transversely in said recess closely adjacent the meeting ends of the thrasher and band-cutter-frames, to be driven direct from the cylinder-shaft, and itself arranged to drive the carrier, band-cutters and feeding-devices of the cutter and feeder, whereby compactness is secured, substantially as herein specified.

In testimony whereof I affix my signature in presence of two witnesses.

HANRY WAPPALHORST.

Witnesses:
EDWARD EVERETT LONGAN,
JNO. C. HIGDON.